(12) United States Patent
Bayer et al.

(10) Patent No.: US 7,171,567 B1
(45) Date of Patent: Jan. 30, 2007

(54) SYSTEM FOR PROTECTING INFORMATION OVER THE INTERNET

(75) Inventors: Leonard Bayer, Rochester, NY (US); Nelson Mathias, Pittsford, NY (US); David Frost, Rochester, NY (US)

(73) Assignee: Harris Interactive, Inc., Rochester, NY (US)

( * ) Notice: Subject to any disclaimer, the term of this patent is extended or adjusted under 35 U.S.C. 154(b) by 1105 days.

(21) Appl. No.: 09/630,422

(22) Filed: Aug. 1, 2000

Related U.S. Application Data

(60) Provisional application No. 60/146,691, filed on Aug. 2, 1999.

(51) Int. Cl.
- G06F 12/14 (2006.01)
- G06F 17/30 (2006.01)
- H04L 9/00 (2006.01)
- H04L 9/32 (2006.01)
- H04K 1/00 (2006.01)

(52) U.S. Cl. .................. 713/193; 713/165; 713/171; 726/27; 705/10; 705/51; 380/255

(58) Field of Classification Search ................ 713/193, 713/200, 201; 705/10
See application file for complete search history.

(56) References Cited

U.S. PATENT DOCUMENTS

| | | | |
|---|---|---|---|
| 4,926,476 A | 5/1990 | Covey | |
| 5,438,508 A | 8/1995 | Wyman | |
| 5,524,238 A | 6/1996 | Miller et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,708,780 A | 1/1998 | Levergood et al. | |
| 5,710,884 A * | 1/1998 | Dedrick ...................... | 709/217 |
| 5,715,403 A | 2/1998 | Stefik | |
| 5,734,380 A * | 3/1998 | Adams et al. .............. | 345/804 |

(Continued)

FOREIGN PATENT DOCUMENTS

WO   WO0197439 A1 * 12/2001

OTHER PUBLICATIONS

Stone et al, Network Policy Languages: A Survey and a New Approach, 2001, IEEE, pp. 10-21.*

(Continued)

*Primary Examiner*—Christopher Revak
*Assistant Examiner*—Aravind K Moorthy
(74) *Attorney, Agent, or Firm*—Kenneth J. Lukacher

(57) ABSTRACT

A system at a web site addressable by one or more client computers. Each client computer connects to the web site to receive a respondent identifier and a viewer. The viewer at the client computer generates a unique viewer identifier identifying the client computer, and sends that identifier to the web site for registration with the respondent identifier. The viewer connects to the web site and downloads a file with encrypted content information. The viewer requests the web site for a key to decrypt the file. Based on the respondent and viewer identifiers, and the particular survey and exposure limits, a key is sent to the client computer. The viewer decrypts the encrypted file with the key, and then shows the content information in a window. During viewing, the viewer ignores interrupts from the computer's user interface enabling copying, and stops showing the decrypted content if another window is selected.

6 Claims, 7 Drawing Sheets

U.S. PATENT DOCUMENTS

| | | | | |
|---|---|---|---|---|
| 5,740,252 | A * | 4/1998 | Minor et al. | 713/153 |
| 5,768,503 | A | 6/1998 | Olkin | |
| 5,818,935 | A * | 10/1998 | Maa | 380/200 |
| 5,875,296 | A | 2/1999 | Shi et al. | |
| 5,889,952 | A | 3/1999 | Hunnicutt et al. | |
| 5,893,098 | A | 4/1999 | Peters et al. | |
| 5,925,126 | A | 7/1999 | Hsieh | |
| 5,933,829 | A | 8/1999 | Durst et al. | |
| 5,944,794 | A * | 8/1999 | Okamoto et al. | 709/225 |
| 5,974,549 | A | 10/1999 | Golan | |
| 5,978,476 | A | 11/1999 | Redman et al. | |
| 5,982,891 | A | 11/1999 | Ginter et al. | |
| 5,987,125 | A * | 11/1999 | Stringer et al. | 713/150 |
| 5,987,134 | A | 11/1999 | Shin et al. | |
| 5,987,232 | A | 11/1999 | Tabuki | |
| 5,999,711 | A | 12/1999 | Misra et al. | |
| 5,999,971 | A | 12/1999 | Buckland | |
| 6,009,526 | A | 12/1999 | Choi | |
| 6,023,509 | A | 2/2000 | Herbert et al. | |
| 6,023,763 | A | 2/2000 | Grumstrup et al. | |
| 6,023,765 | A | 2/2000 | Kuhn | |
| 6,078,891 | A * | 6/2000 | Riordan et al. | 705/10 |
| 6,102,287 | A * | 8/2000 | Matyas, Jr. | 235/380 |
| 6,141,754 | A * | 10/2000 | Choy | 713/200 |
| 6,167,523 | A * | 12/2000 | Strong | 713/201 |
| 6,272,547 | B1 * | 8/2001 | McWilliams | 709/232 |
| 6,298,446 | B1 * | 10/2001 | Schreiber et al. | 713/201 |
| 6,308,270 | B1 * | 10/2001 | Guthery | 713/200 |
| 6,353,892 | B2 * | 3/2002 | Schreiber et al. | 713/201 |
| 6,477,504 | B1 * | 11/2002 | Hamlin et al. | 705/10 |
| 6,584,199 | B1 * | 6/2003 | Kim et al. | 380/203 |
| 2004/0210472 | A1 * | 10/2004 | Lew et al. | 705/10 |

OTHER PUBLICATIONS

Lee et al, A Survey of Watermarking Techniques Applied to Multimedia, 2001, IEEE, pp. 272-277.*

Metzger et al, Public Opinion and Policy Initiatives for Online Privacy Protection, 2003, Journal of Broadcasting & Electronic Media, pp. 350-374.*

Burkey et al, Web-Based Surveys for Corporate Information Gathering: A Bias-Reducing Design Framework, 2003, IEEE, pp. 81-93.*

* cited by examiner

SYSTEM FOR PROTECTING INFORMATION OVER THE INTERNET

This application claims the benefit of priority to U.S. Provisional Patent Application No. 60/146,691, filed Aug. 2, 1999, which is herein incorporated by reference.

FIELD OF THE INVENTION

The present invention relates to a system (and method) for protecting information over the Internet or other public networks, and relates particularly to, a system for protecting the viewing of information at a computer system which is connected over the Internet to the system. The invention is especially suitable for conducting surveys over the Internet via a computer in which part of the survey viewed on the display of the computer must be protected from unauthorized viewing and copying. The invention may also be applied to any other application where viewing of information at a computer requires authorization and protection from copying, where rights to limited viewing of the information are received via the Internet. Viewing is generally defined herein as displaying graphics, text, video, or other information with any accompanying audio.

BACKGROUND OF THE INVENTION

Conventionally, surveys or polls are a series of questions on a form presented to individuals, called voters, to sample the views of people in a given region or country for political, commercial or entertainment purposes. Surveys are typically conducted either in person, mail, or via telephone to a great number of individual voters. With the development of the Internet and its growing widespread use, surveys can now be taken by persons at their computer. For example, a system for conducting surveys over the Internet is described in U.S. patent application Ser. No. 09/243,064, filed Feb. 2, 1999. Often surveys are used to test concepts, such as the packaging of a new food product, before companies make an investment in the product or to determine the best way to advertise the product. It is important in concept test surveys that the information used to convey the content of the concept be prevented from view by competitors who could use the information to the disadvantage of the company supporting the survey. This is easy in conventional surveys where the viewed information is provided in a protected environment of in-person polling. However, in surveys conducted over the Internet, the environment of the typical web browser software enables a user easily to copy downloaded information of a survey to a storage file, E-mail, or printer. Thus, it would be desirable to conduct a survey over the Internet in which content information of the survey is protected from unauthorized viewing or copying.

Complicated systems for downloading digital works to computer systems have been developed capable of providing billing and payment to the owners of the digital works based on usage, such as copying or displaying, which may be metered. For example, U.S. Pat. Nos. 5,629,980, 5,638,443, and 5,715,403 describe a system for controlling the distribution and use of digital works in which usage rights are permanently attached to each digital work stored in repositories, and rendering systems receiving a digital work have access to the work in accordance with the usage rights attached to the work. In another example, U.S. Pat. No. 5,982,891 provides a system for virtual distribution to electronic appliances, such as computers, to enable payment for use, and reporting of use, of content distributed to such electronic appliances. The electronic appliance can have a secure processing unit to provide a processing environment offering tamper resistance. In the electronic appliance, access to distributed content is not allowed unless control information, rules and controls, for that content is present at the appliance specifying usage. These systems, which may use encryption/decryption techniques, are complex in order that they can support traditional commercial distribution and transaction methods for digital works. Unauthorized copying of digital works is primarily prevented by the usage or control information which must be present, or permanently attached, to digital works.

SUMMARY OF THE INVENTION

It is the principal object of the present invention to provide an improved system for protecting information over the Internet from unauthorized viewing and copying.

It is another object of the present invention to provide an improved system for protecting information over the Internet transmitted to a computer as part of a survey.

A still further object of the present invention is to provide an improved system for protecting information over the Internet transmitted in a content file to a computer in which no specific usage control information, i.e., information defining how the content file may be used, is provided, or otherwise associated with the transmitted content file, in contrast with prior art distribution systems for digital works.

Yet another object of the present invention is to provide an improved system for protecting information over the Internet in which a network computer can enable a client computer having received an encrypted content files to be authenticated by the network computer using a plurality of identifiers before the client computer can receive a key to decrypt the content file.

A further object of the present invention is to provide an improved system for protecting information in which a computer receiving a content file has focus control to protect displayed information from the content file from being readily accessed and thereby copied.

Briefly described, the content protection system embodying the present invention includes a web site addressable by one or more client computer systems for connecting to the content protection system over the Internet or other public network. Each client computer system connects to the web site and receives a respondent identifier and viewer software. When the viewer software is installed at the client computer system, it generates a unique viewer identifier identifying the client computer system. The viewer identifier is sent to the web site for registering the viewer identifier with the respondent identifier. The web site has a database and one or more web servers coupled to the database. The database stores registration information including the viewer identifier and associated respondent identifiers for the client computer systems, encrypted content information files and keys to decrypt such files, survey invitation information for each of the surveys, and exposure limit information to determine whether content information can be viewed by a client computer system. Based on the survey invitation information, if the user of the client computer system has been selected to participate in a survey, the client computer system receives an E-mail invitation to participate including a unique survey identifier associated with the survey and the respondent identifier of the client computer system. The survey may represent any program which requires content information to be viewed in a secure environment. In response to receiving a survey, in accordance with the E-mail invitation, from the web site, or another web site, the client computer system enables the content viewer to connect to the web site of the content protection system and download a file with the encrypted content information for that survey. The downloaded file has no associated information regarding usage of the file by the client computer system. The encrypted content information is identified by a unique content identifier. The encrypted file may alternatively be provided from another source on the client computer system, such as a disk or CDROM. The viewer software sends a request to the content protection system for a key to decrypt the downloaded content information file, and includes in the request the respondent, viewer, survey, and content identifiers. The content protection system determines whether the respondent, viewer and survey identifiers match corresponding identifiers of the participants invited to take the survey stored in the database of the system, determines based on the exposure limit information whether the content information can be viewed at the client computer system, and if the survey has not yet been taken by the user at the client computer system. If so, the decryption key is sent to the client computer system and the viewer uses the key to decrypt the encrypted content information file, and then opens a viewer window to show (graphic or text) or play (video, animation, or audio) the decrypted content information on the display of the computer system. If not, an error message is sent to the client computer system.

During viewing, the viewer ignores interrupts from the keyboard and mouse which typically allow the user to access information and thereby enable copying, such as a print screen key, right mouse button, or screen scraper. If the user selects another window other than the window of the viewer, the viewer stops showing the decrypted content and displays a protection image in its place. Thus, the content information is protected from authorized viewing by encryption and protected from unauthorized copying by limiting the ability of the user access to only viewing.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1:
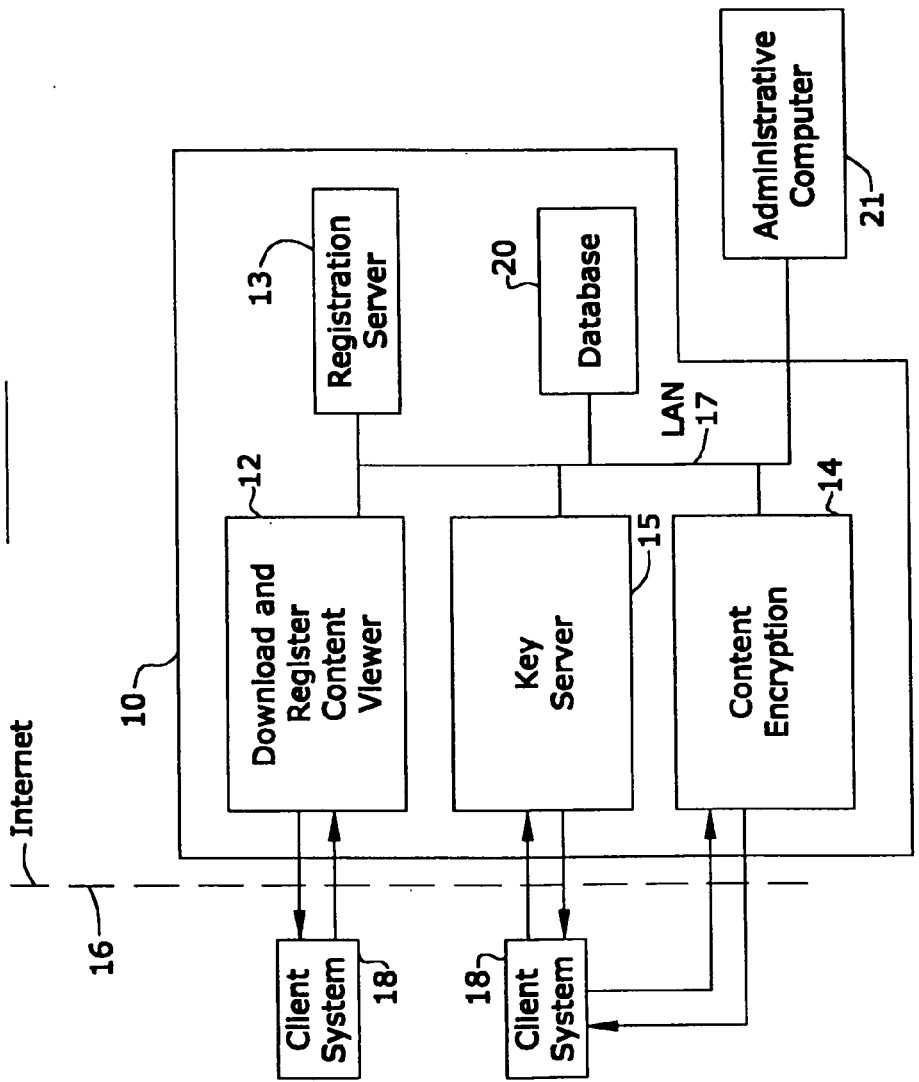
FIG. 1 is a block diagram of the system according to the present invention illustrating the network connection of components of the system with client computer systems.

Referring to FIG. 1, the system 10 of the present invention is shown having multiple web servers 12, 13, 14, and 15 at a web site which are capable of establishing a network connection over the Internet 16 or other public network with one or more client computer systems 18. Client computer system 18 represents a desktop, laptop, WebTV, or other computer system having typical web browser software, such as Microsoft Explorer or NetScape Navigator, and network interface, such as a modem, or T1/T2 data line to an Internet Service Provider, for communicating to web sites at Internet addresses associated with such sites. The web servers 12–15 are connected to a LAN 17 and have access to database 20. The Download and Register Content Viewer server 12 is coupled to the Internet 16 and has an Internet address or URL enabling a user at client computer system 18 to connect to the web server 12 and download a file referred to as content viewer software. The Registration server 13 updates and maintains registration information in the database 20 identifying the client computer system and installed content viewer software at the client computer system. The Content Encryption server 14 provides for assigning a unique identifier to each content file representing information, such as an image, text, video, audio, or animation, encrypting the content file, determining a decryption key for the encrypted content file, and storing the content file at a URL on the server 14 or another web site on the Internet. The server 14 also allows a client computer system 18 to receive an encrypted content file at the URL associated with the file. The Key server 15 has a URL addressable by the viewer software installed at the client computer system 18 to request the decryption key associated with a downloaded encrypted file. The database 20 stores in addition to registration information and information about each encrypted content file, exposure limit information on the rules regarding when the content may be viewed and how many times the content may be viewed at a client computer system, and survey and invitation information defining the survey requiring viewing of content files and the participants (registered client computer systems) selected for each survey, as will be described later in connection to FIG. 3. The database 20 may be stored in memory, such as the hard drive or RAM, of a computer or another server, or may be contained in memory of one of servers 12–15.

One or more administrative computers represented by computer 21 can be coupled to LAN 17. The administrative computer 21 can send content files to the content encryption server 14 for encryption, and update the database with regards to the survey, invitation information and exposure limit information.

Figure 2:
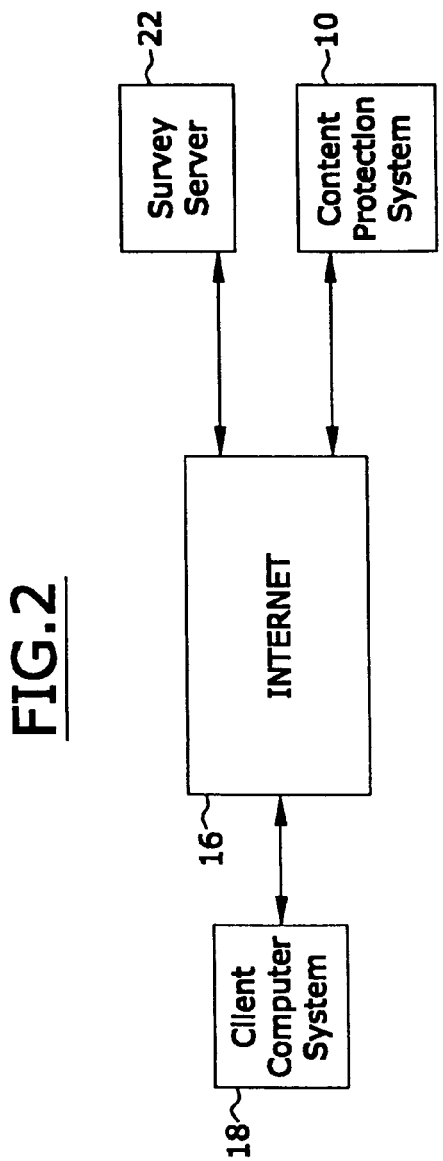
FIG. 2 is a block diagram of the content protection system of FIG. 1 with a survey server and one of the client computer systems.

Referring to FIG. 2, the content protection system 10 of the present invention operates to enable a user to view encrypted content files which are called as part of a survey received from a survey server 22. A survey represents an HTML file which is downloaded to the client server and viewed via the web browser of the client computer system. Each survey has a unique identifier called a SurveyID. The survey may be addressed in reference to a SurveyID, or the SurveyID may be referred in the downloaded HTML file. The survey represents questions and each question has an answer set having buttons or text entry fields, which simulates a written survey. A submit button at the bottom of the survey page on the screen may be clicked upon by the user, such as via a mouse, to send the selected answers to each question to the survey server 22 for tabulation. The survey may be conducted over the Internet as described in U.S. patent application Ser. No. 09/243,064, filed Feb. 2, 1999, which is herein incorporated by reference. A survey, which requires the user to view a content file encrypted by the content protected system before answering one or more questions, may automatically enable the content viewer, if installed on the client computer system, to connect to the URL of the content protection system's Content Encryption server 14 to first obtain the encrypted content file and then request the decryption key from the Key server 15. The user at a client computer system 18 can receive an invitation, such as in an E-mail message, to link to the address of the survey server, or the user can address the survey server. Although reference is made to a survey, the survey may represent any program or file which requires information to be viewed. Further, the survey server may be a separate web site, or can be included in the web site of the content protection system.

Figure 3:
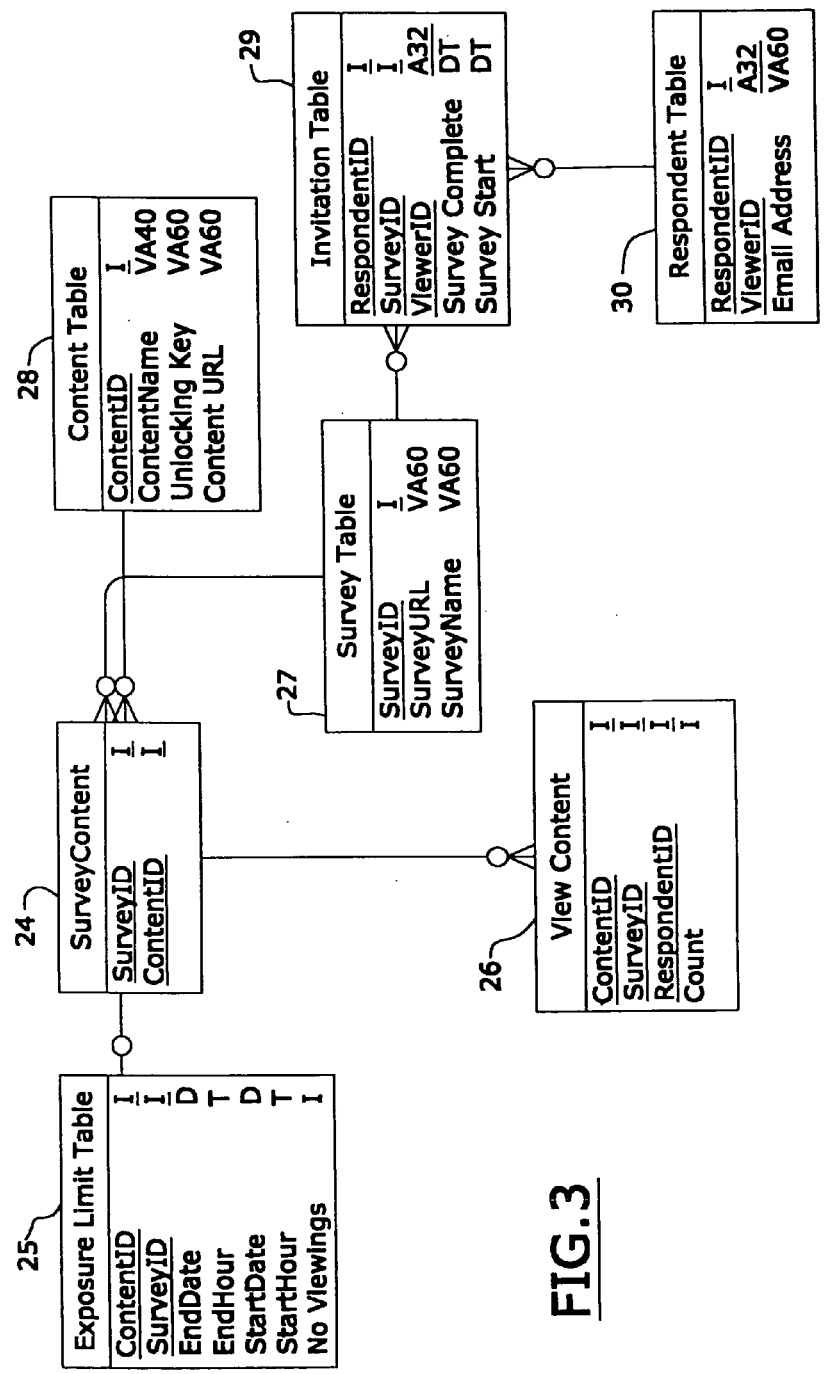
FIG. 3 illustrates the tables of the database of the content protection system of FIG. 1.

Records of multiple tables are stored in database 20 shown in FIG. 3. The records of the Exposure Limit 25 and ContentView 26 tables store exposure limit information. The records of the Respondent table 30 store registration information. The records of the Survey 27 and Invitation 29 tables store survey and invitation information. The records of the SurveyContent 24 and Content 28 tables store the information regarding the content files. Each table is related to each other by one or more identifiers defined as follows: ContentID is an identifier to an encrypted content file; SurveyID is the identifier of a particular survey; RespondentID is an identifier for an invitation to take a survey or view secure content; ViewerID is an identifier which uniquely identifies a client computer system for an instance of the viewer software downloaded to a client computer system. The RespondentID need not be unique, but when combined with the ViewerID may be considered unique in representing a survey participant.

The SurveyContent table 24 has two data fields, SurveyID and ContentID. Each record in the SurveyContent table links a particular survey having the SurveyID to an encrypted content file having the ContentID. The Exposure Limit Table 25 has records with the following data fields: ContentID; SurveyID; EndDate, the last date which the encrypted file associated with the ContentID of the record can be viewed; EndHour, the time (hour and minute) on the EndDate when the encrypted file associated with the ContentID of the record can no longer be viewed; StartDate, the first date which the encrypted file of the ContentID of the record can be viewed; StartHour, the time (hour and minute) on the StartDate when the encrypted file associated with the ContentID of the record can be viewed; and No Viewing, a number indicating the number of times the encrypted file associated with the ContentID can be viewed by a client computer system. The View Content table 26 has records with the following data fields: ContentID; SurveyID; RespondentID; and Count, the number of times the client computer system associated with the RespondentID has viewed the content file associated with the ContentID for the survey associated with the SurveyID of this record. The Survey table 27 has three data fields: SurveyID; SurveyURL, the network address of the survey at the survey server; and SurveyName, the name of the survey. The Content table 28 has records with the following data fields: ContentID; ContentName, the name of the encrypted content file associated with the ContentID of this record; and Unlocking Key, the decryption key associated with the encrypted content file associated with the ContentID of this record; ContentURL, the network address where the encrypted content file of the ContentID of this record can be accessed. The Invitation Table 29 has records with the following data fields: RespondentID; SurveyID; ViewerID; Survey Complete, the date and time when the survey associated with the SurveyID was completed at the client computer system having the RespondentID and associated ViewerID; and Survey Start, the date and time when the survey associated with the SurveyID was started at the client computer system having the RespondentID for the associated viewer software ViewerID. The Respondent Table 30 has records with the following data fields: RespondentID; ViewerID associated with the RespondentID; and E-mail, the E-mail address of the RespondentID. In the example of tables 25–30 shown in FIG. 3, each of the types of different data fields are indicated by "I" for an integer number, "D" for date, "T" for time, "VA" for variable alphanumeric followed by a number indicating the maximum character length, and "A32", for a fixed length alphanumeric of 32 characters. The database tables 25–30 will further be described in connection with FIGS. 5 and 7.

Figure 4:
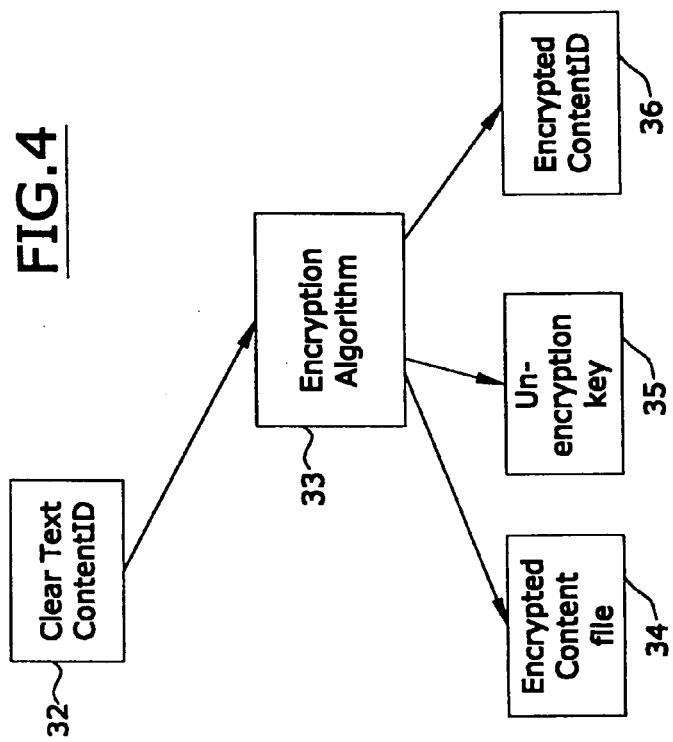
FIG. 4 is a flow chart showing the encryption by the Content Encryption server of FIG. 1.

Referring to FIG. 4, the administrative computer 21 can send unencrypted (clear text) content file to the Content Encryption server 14 with a ContentID and name to be associated with the content file. The content file may contain data in the form of text, graphics, video, or audio, and can represent a commercial or advertisement for a product or service. The Content Encryption server 14 processes the unencrypted content file 32 in accordance with an encryption algorithm 33 to provide an encrypted content file 34, a decryption (unencryption) key 35, and an encrypted ContentID 36. The encryption algorithm 33 may be any type of typical encryption algorithm requiring an unencryption key associated with an encrypted file. For example, the encryption algorithm may be in accordance with the Federal Data Encryption Standard (DES). Server 14 creates a record in the Content table 28 specifying the ContentID, the Content Name, Decryption key, and the URL where the encrypted content file is stored. For a survey, multiple records are provided in the Invitation table 29 for the survey's SurveyID, where each record has a ViewerID associated with a particular client computer system and a RespondantID associated with the ViewerID for that survey. In this manner, the participates are selected for a survey. This selection may be made randomly from the pool of records of the Respondent table 30 by server 14, or the administrative computer may select each of the participants from the records of the Respondent table. The records in Respondent table 30 in addition to E-mail addresses may have data fields storing other information entered at registration, such as age or sex, or other information typically used to select participants in polling.

For each survey (or program) requiring the viewing of one or more encrypted content files, the administrative computer 21 adds a record to the SurveyContent table 24 of the database linking the encrypted content file, ContentID, with the particular survey, SurveyID. Further, a record in the Exposure Limit table 25 is created specifying for the encrypted content file, ContentID, and SurveyID, the number of viewings for each client computer system, the start date and time of the content file may be viewed, and end date and time the content file may be viewed. Further, each survey, SurveyID, may have a record in the Survey table 27 specifying the URL associated with the survey at the survey server 22, and the name of the survey. The URL may be specified by the administrative computer or by the server 14. The administrative computer may be programmed with an administrative interface for updating (adding, deleting, or changing) the records in the tables 25–30 of database 20 in which edit fields correspond to the data fields of the tables.

Figure 5:
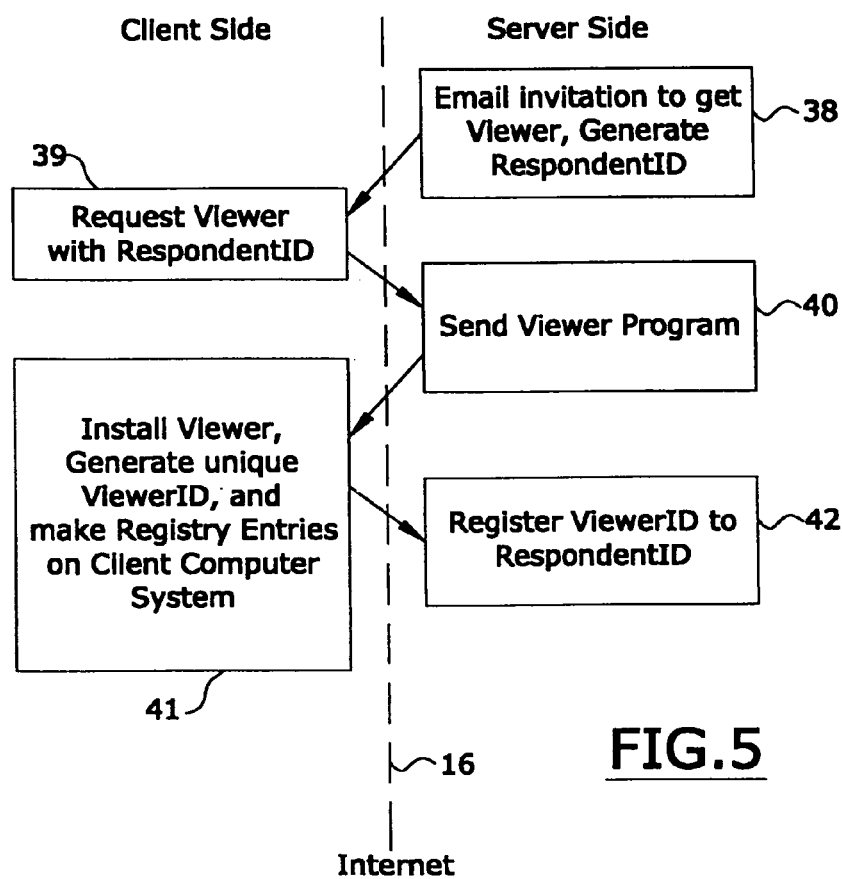
FIG. 5 is a flow chart showing the operation for downloading and registering of the viewer software from the content protection system to one of the client computer systems.

Before a user can participate in the survey requiring viewing of the information of a content file, the content viewer must be installed on their computer system 18. To receive the content viewer software, the content control system 10 sends from server 12 to the client computer system of a user an E-mail invitation to participate in a survey in the future with the URL of the server 12 (step 38), as shown in FIG. 5. Each E-mail invitation contains a RespondentID. The URL of server 12 enables the web browser of the client computer system 18 to link to a page at server 12 which enables the user to send a request to download of the content viewer software (step 39). This request includes the RespondentID received via the E-mail Invitation. In response to receiving the request, server 12 sends the content viewer program with an installation program (step 40). The client computer system 18 receives the content viewer and installation software, and the installation program of the viewer is manually executed by the user at the client computer system 18 to install the viewer in memory of the computer, such that it can be called when needed by a survey received from the survey server 22 (step 41). The installation program registers the content viewer in the Windows registry of the client computer system with a specific application type so a file with the same extension can invoke the viewer. The registration process generates a unique ViewerID to identify the client computer system 18, such as described below. After installation of the viewer, the E-mail invitation asks the client computer user to register the content viewer with server 12 by browsing to a URL, or via a dialog box which appear at the end of the viewer installation, to complete the registration. By connecting to this URL, the ViewerID is sent to server 12 to be stored (registered) in a record of the Respondent table 30 of the database with the RespondentID received in the E-mail invitation (step 42). The user is also asked during registration for their E-mail address and any other information to be stored in this record.

The ViewerID may be generated by a call to the Win32 system API CoCreateGUID. The ViewerID is generated to uniquely identify the client computer system 18, and may be based on: the current date and time, a clock sequence and related persistent state to deal with retrograde motion of clocks, a forcibly incremented counter to deal with high-frequency allocations, and the truly globally unique IEEE machine identifier, obtained from a network card, or other highly variable machine states. Thus, the registration process now ties together, in Respondent table 30 of database 20, the user's original E-mail address, the RespondentID sent to the user at the start of the registration process, and the ViewerID generated during viewer installation. If the user changes his E-mail address, the user must re-register his copy of the viewer, as described above.

Figure 6:
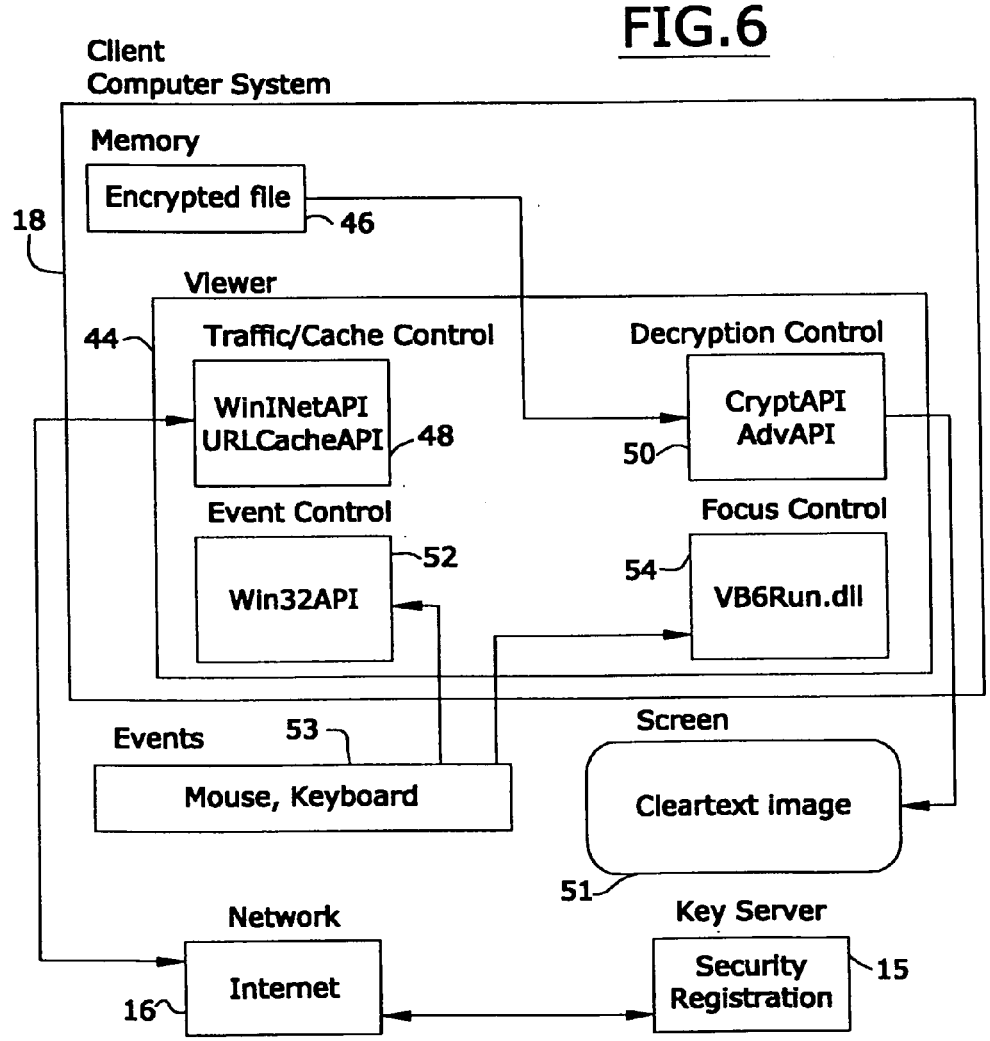
FIG. 6 is a block diagram of one of the client computer system of FIGS. 1 and 2 showing the installed viewer software.

Referring to FIG. 6, the client computer system 18 and installed content viewer software 44 is shown. The client computer system 18 operates on the window operating system or platform, typically referred to as the Win32 environment. The computer 18 has memory (RAM or hard disk drive) storing the encrypted content file 46 downloaded from the web site of the content protection system. Alternatively, the encrypted content file may be stored on a disk or CDROM received via a disk or CDROM drive of the client computer system 18. The content viewer 44 has several modules, and operates using API and DLL functions (or calls to programs) in Win32, as shown in FIG. 6. In the Traffic/Cache Control Module 48, the communication with the content encryption server 14 is conducted using WinInet API calls, as typical of network communication between a web server and a client computer. Once the communication is established, the same set of API calls are used to download encrypted content from the referenced URL's. Further, at module 48, once the content is downloaded, the content is stored in the client computer's cache directory. These files are accessed using the URLCacheAPI. After the content is downloaded and decrypted, the keyboard, mouse and focus control are handled by hooks to the Win32API and the VB6 runtime DLL library. The Decryption Control Module 50 utilizes Window's CryptAPI to call to the viewer from the Window operating system for decrypting the data of encrypted file in accordance with a received decryption key, and Window's AdvAPI call to send the decrypted image to the screen of the display 51 of the client computer system 18. When a decrypted image is displayed on the screen, the Event Control Module 52, via the Win32API, monitors interrupt events 53 from the mouse and keyboard (i.e., user interface). The Focus Control Module 54 is activated if the user switches focus away from the content viewer, such as the Alt-Tab, pressing of the left button on the mouse, clicking on another window on the screen or the screen's desktop. The Focus Control Module 54 in response to a switch in focus from the user, immediately stops the viewer from showing the decrypted content information, and instead shows a protection image in the window of the content viewer, such as a gray screen with a copyright notice or other information.

Figure 7:
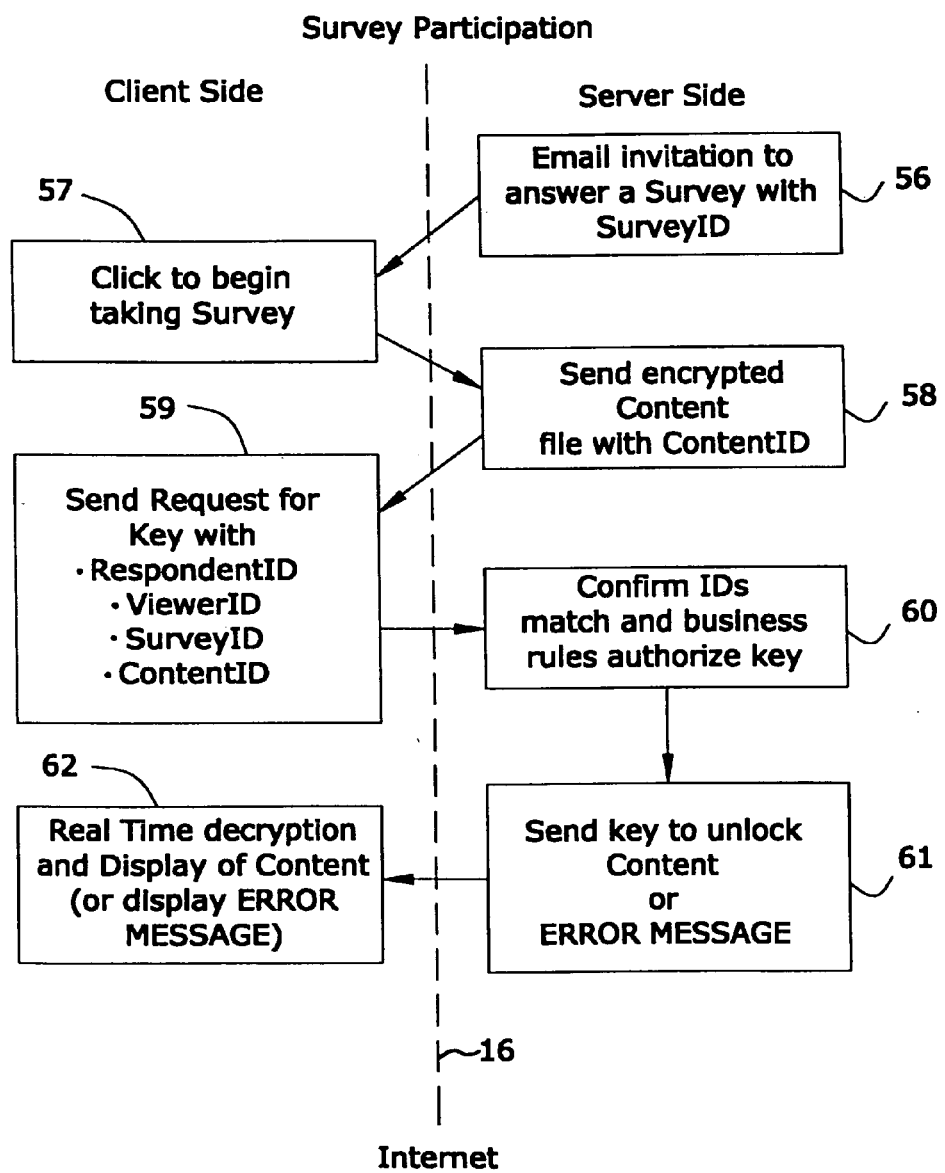
FIG. 7 is a flow chart showing the operation of the system for protecting content information received as part of a survey.

Referring to FIG. 7, the operation of the system will now be described. The content protection system sends to a client computer system 18 an E-mail invitation to participate in a survey based on the records in the Invitation Table for the SurveyID associated with the survey (step 56). The Key server locates each RespondentID to participate in the survey using the records of the Invitation table associated with the SurveyID of the survey, and then related records in the Respondent Table for E-mail address associated with the RespondentID. The E-mail invitation, in addition to a message requesting their participation in the survey, includes the SurveyID and RespondentID and the URL of the survey server 22 (FIG. 2). Although this invitation is preferably E-mail, the same information may be sent to the user through regular mail or other advertising media. The invitation contains a network address of the survey server which references the SurveyID of the survey. In the case where an E-mail invitation is used, the address may be in an embedded hyperlink upon which the user clicks upon to contact the survey server and receive the HTML page with the survey. The RespondentID may be an embedded as a parameter in the URL, or the opening dialog box of the survey may request it from the user. (The RespondentID may have been given to the user, such as by display to the user, at the earlier described registration process). Upon receipt of the survey, the web browser of the client computer system operates in accordance with the HTML code of the survey to enable the viewer, which then sends a request to the web site of the content protection system for the encrypted files based upon the SurveyID (step 57). In response, the content protection system, such as server 14, queries for all records of the SurveyContent table having the SurveyID and locates the ContentID associated with the SurveyID. In addition, the SurveyStart field of the record of the Invitation table for the RespondentID is updated with the current date and time to show that the survey has commenced. The record of the Content table having the ContentID is then accessed to locate the URL where the encrypted content information file will be found. This URL points to a file which contains the location of the encrypted content. This encrypted content file is then downloaded from this URL address to the client computer system, via the content viewer, at the client computer system (step 58). If multiple records were located in the Content table for the SurveyID, each encrypted content file is separately downloaded to the client computer system immediately prior to processing.

After receiving the downloaded file, the HTML code for the survey (or the content viewer) operates the viewer to send a request, via the Internet, to the Key server 15 (FIG. 1) for the decryption key for the downloaded file (step 59). The request includes the RespondentID and ViewerID which was stored with the viewer when installed, the SurveyID of the survey, and the ContentID of the encrypted content file.

At steps 60–61, the Key server 15 receives, via the Internet 16, the request from the client computer system 18, and sends the decryption key from the record of the Content table 28 having the ContentID to the client computer system requesting the key if the Key server:

1) can locate the RespondentID, SurveyID and ViewerID of the request in the same record of the Invitation table 29;

2) the current date and time is within the specified time period, i.e., date and time range (StartDate, StartHour, and EndDate, EndHour), of the record of the Exposure Limit table 25 for the ContentID and SurveyID of the request;

3) if a record is present in the View Content table 26 having the ContentID, SurveyID, and RespondentID of the request, that the Count field of the record is less than the No Viewing field of the record in the Exposure Limit table 25 for the ContentID and SurveyID of the request; and, 4) the Survey Complete field of the Invitation table 29 having the RespondentID, SurveyID and ViewerID of the request, is not set to a date and time (i.e., indicating that the survey has not yet been taken).

If either conditions 1–4 are not true, an error message is sent to the client computer system 18 from the Key server 15. After sending the key, if a record exists in the View Content table 26 for the ContentID, SurveyID, and RespondentID of the request, the Key server increments the count value by one, otherwise the Key server adds a record in the View Content table for the ContentID, SurveyID, and RespondentID and the count value is set to one. Thus, condition 1 confirms matching of ID's to that of the request to identify preselected invited survey participants, while conditions 2–4 represent examples of business rules to authorize sending of the key. Any number or different business rules may be used, and are not limited to those specified above. For example, although preferably conditions 1–4 must be true, the system may operate using only conditions 1 and 4, if no associated record for the SurveyID are present in the Exposure Limit table or the View Content table, respectively.

The key is received by the viewer of the client computer system, the viewer decrypts in real time the encrypted file, opens a viewer window, and shows (graphic or text) or plays (video, animation, or audio) the decrypted content information on the display screen of the computer system (step 62). The viewer may call a player installed at the client computer system, such as Microsoft Media Player, in accordance with the type of decrypted content information, if needed to utilize the decrypted content information. However, if an error message is received by the client computer system instead of a key, it is also displayed on the display screen.

During viewing, the viewer checks the interrupts received from the keyboard and mouse (or other user interface device of the client computer system) and ignores the interrupts which would enable the user at the client computer potential access to the decrypted content information. If interrupt signals representing the right mouse key, print screen key, or screen scraper are received by the windows operating system, the viewer discards the interrupts. If the window loses focus, such as by the user clicking, via the mouse, on another window on the screen, the viewer window displays only a screen with a copyright notice or other message. Play of display resumes when the viewer again receives focus, such as by the user clicking, via the mouse, on the viewer window.

After viewing is completed, the user can close the viewer window and proceed to answer the questions of the survey. The user submits the answers by clicking on a button on the survey page, which sends the answers to the survey server and a message to the content protection system, i.e., Key server, that the survey was completed with the RespondentID, SurveyID and ViewerID. The survey complete field of the record in the Invitation table 29 having the RespondentID, SurveyID and ViewerID is updated with the date and time the message was received.

Upon receiving a survey invitation, if the client computer system 18 cannot call the content viewer software (since it has not been installed), the HTML code of the survey will not operate. The Key server 15 will allow the installation and registration of the content viewer. However, the client computer system 18 will still not decrypt the content for this particular survey, since there will be no corresponding record in the Invitation table of database 20. Once registered, the client computer system 18 may receive future invitations to participate in surveys with protected content that the user will be able to complete successfully.

In this manner, user interaction with the client computer system 18, via its user interface, is limited during display by the viewer to prevent access to the decrypted content file, and thereby possibly unauthorized electronic copying or printing. As the focus control limits access, no specific usage control information, defining how the content file may be used at the client computer, need be associated or attached with each content file in the client computer system, as in complex prior art distribution systems for digital works. Thus, the content file is not transmitted to the client computer system 18 with usage control information.

The data structures of the tables of the database 20 described above are exemplary. Other data structures may be used with different tables for storing the information described therein.

From the foregoing description, it will be apparent that an improved system for protecting information over the Internet has been provided. Variations and modifications of the herein described system and other applications for the invention will undoubtedly suggest themselves to those skilled in the art. Accordingly, the foregoing description should be taken as illustrative and not in a limiting sense.

The invention claimed is:

1. A method for conducting a survey at a computer connected to the Internet comprising the steps of:

sending a survey to the computer via the Internet which references a network address to obtain a file for said survey;

downloading said file from said network address in which said file is encrypted;

requesting a key to decrypt said encrypted file from a network address where said key is available;

receiving a key at the computer when said computer is associated with a participant selected to take said survey; and decrypting the file in accordance with said key and playing the decrypted file as part of the survey.

2. The method according to claim 1 further comprising the steps of:

playing the decrypted file in a window on a display coupled to the computer; and protecting said window from being accessed by the user of the computer when another window on the display is selected.

3. The method according to claim 1 further comprising the step of registering the computer for receiving said survey prior to carrying out said sending survey step.

4. The method according to claim 1 wherein said receiving a key step further comprises the step of sending the key to the computer when said key has been requested during a certain period of time.

5. The method according to claim 1 wherein said receiving a key step further comprises the step of sending the key to the computer when computer has not already received the encrypted file a preset number of times.

6. The method according to claim 1 wherein said receiving a key step further comprises the step of sending the key to the computer when a participant has not taken the survey.

* * * * *